No. 720,380. PATENTED FEB. 10, 1903.
A. R. PRITCHARD.
SCREW CAP.
APPLICATION FILED MAY 19, 1902.
NO MODEL.
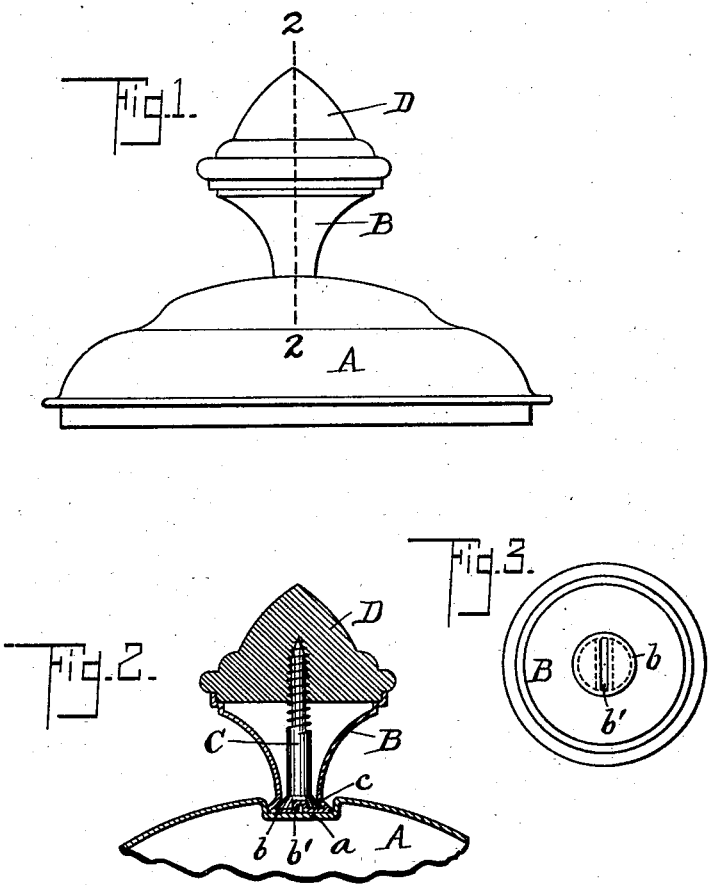
Witnesses—
F. Bissell.
D. Gurnee.
Inventor—
Albert R. Pritchard
by Osgood & Davis
his attys

UNITED STATES PATENT OFFICE.

ALBERT R. PRITCHARD, OF ROCHESTER, NEW YORK.

SCREW-CAP.

SPECIFICATION forming part of Letters Patent No. 720,380, dated February 10, 1903.

Application filed May 19, 1902. Serial No. 107,969. (No model.)

*To all whom it may concern:*

Be it known that I, ALBERT R. PRITCHARD, a citizen of the United States, and a resident of Rochester, in the county of Monroe and State of New York, have invented certain new and useful Improvements in Screw-Caps, of which the following is a specification.

This invention relates to screw-caps, and is particularly applicable to knobs for pots and kettles and to metallic knobs to be fastened to furniture.

The invention consists in the mechanism hereinafter described and claimed and is illustrated by showing its application to a knob for the cover of a pot or kettle.

In the drawings, Figure 1 is a side elevation of a top or cover for a pot or kettle having this invention applied thereto. Fig 2 is a vertical section on the line 2 2 of Fig. 1, and Fig. 3 is a bottom plan view of the metallic portion of the knob shown in Figs. 1 and 2.

In the drawings, A is the cover of a pot or kettle, having a depressed socket $a$, Fig. 2, in the top thereof. Into this socket is set the lower end of the metallic cap B. This cap carries the screw C, which screws into the knob D, which may be of wood or other suitable material. The cap B and screw C constitute the screw-cap.

The cap B is adapted to fit the enlarged head $c$ of the screw C. This fitting is accomplished by first forming the sheet-metal cap B of such a size that the head of the screw may be set in the bottom thereof and thereafter contracting the walls of the cap B around the head $c$, so that said head cannot be moved from its position. This may be accomplished by the screw having a reduced portion adjacent to its head or end and forcing the metal of the cap into the reduced portion. In order that the screw-head may not be turned when held in place as just described, a portion of the solid bottom $b$ of the cap B is indented, as at $b'$, forcing a portion of the material of the cap into a notch in the head of the screw. This depression of the material may be all the way across said notch, as indicated in Fig. 3, or may be partial. Since the screw C is now firmly held in the cap B both against longitudinal movement therein and against rotation with reference thereto, the screw is firmly held in place without the employment of solder or other material. When the screw-cap is thus produced, the screw may be employed to fasten a knob D of wood or other suitable material to the screw-cap by revolving the whole screw-cap as its screw enters the material of the knob. Of course instead of the screw C a bolt may obviously be employed.

The lower end of the screw-cap B having been set in the socket $a$ of the sheet-metal-ware article, such as the cover A, it may be held firmly in place by soldering the screw-cap B and the cover A together; but if the screw-cap is to be attached to another article, such as to a piece of furniture, it is screwed or bolted to it by its own bolt or screw. By this method of production the screw is firmly and permanently fastened to the screw-cap without the uncertainty of the use of solder or other methods of fastening heretofore in use.

What I claim is—

In a sheet-metal-ware screw-cap, a screw having a reduced portion adjacent to its end and a notch, a cap having a socket for said end, the said cap being contracted into said reduced portion and to inclose said end, and a depression extending into said notch.

ALBERT R. PRITCHARD.

Witnesses:
F. BISSELL,
D. GURNEE.